United States Patent [19]

Kosugi

[11] Patent Number: 4,865,279
[45] Date of Patent: Sep. 12, 1989

[54] CLAMP MEMBER WITH STRUCTURE FOR FIRMLY SECURING PIPING AND WIRING

[75] Inventor: Masaru Kosugi, Shizuoka, Japan

[73] Assignee: Usui Kokusai Sangyo Kaisha Ltd., Shizuoka, Japan

[21] Appl. No.: 227,725

[22] Filed: Aug. 3, 1988

[30] Foreign Application Priority Data

Aug. 12, 1987 [JP] Japan .............................. 62-123552

[51] Int. Cl.⁴ .............................................. F16L 3/22
[52] U.S. Cl. .................................. 248/68.1; 24/563; 248/74.5
[58] Field of Search ............... 248/68.1, 74.5, 74.2, 248/51, 231.8, 316.7, 316.1; 174/40 CC, 154; 24/563

[56] References Cited

U.S. PATENT DOCUMENTS

| | | | |
|---|---|---|---|
| 1,873,881 | 8/1932 | Hall | 248/68.1 |
| 2,366,041 | 12/1944 | Morehouse | 248/68.1 X |
| 2,682,384 | 6/1954 | Eichelberger | 248/68.1 |
| 2,683,578 | 7/1954 | Rainey | 248/68.1 |
| 3,995,795 | 12/1976 | Hogan | 248/68.1 |

*Primary Examiner*—Ramon S. Britts
*Assistant Examiner*—Karen J. Chotkowski
*Attorney, Agent, or Firm*—Anthony J. Casella; Gerald E. Hespos

[57] ABSTRACT

A clamp member with structure for firmly securing piping and wiring comprises a clamp body made of a metal strip piece and an endless belt made of a thermally contractable resin material. The clamp body has a flat mounting wall section for mounting to a mating substrate and a sectionally semi-circular curved wall section defined by folding back of the remaining portion of the metal strip piece. With a pipe loosely laid inside the endless belt the remaining portion of the endless belt is fitted from inside to the curved wall section, and a pin or another pipe is inserted in an inner space defined by the fitted remaining portion of the endless belt to prevent falling off of the endless blet. Then, the endless belt is heated to cause its thermal contraction; as a result, the parts laid inside the endless belt are firmly secured and held by the curved wall section.

6 Claims, 1 Drawing Sheet

CLAMP MEMBER WITH STRUCTURE FOR FIRMLY SECURING PIPING AND WIRING

BACKGROUND OF THE INVENTION

1. Field of the Invention

This invention relates to a clamp member for fixing piping and wiring, and more particularly, to an improved structure of the clamp member which facilitates firm securing of metal pipes, resin tubes, wire harnesses, etc. (hereinafter referred to as parts to be secured) of comparatively small diameter not exceeding about 30 mm that are to be laid down in cars, or in various machines, equipment, devices and the like as lines for feeding oil, gas, electricity, etc.

2. Description of the Prior Art

A conventional firmly securing structure is as shown in FIG. 5. That is, a clamp body 11 has a flat mounting wall section 13 formed with a mounting hole 12, and a curved wall section 14 defined by folding back of the remaining portion of the clamp body. In use, with a pipe P' laid inside the curved wall section 14, this curved wall section is caulked from outside to pinch or press the pipe, or the mutually contacting peripheral surfaces of the pipe and the curved wall section 14 are fixed together by hot brazing, for example.

According to such a conventional securing structure, however, in the casee of caulking, after a pipe is pinched from outside, slackening occurs due to spring back of the curved wall section 14, so that the pipe will deviate, shift or fall from the clamp body 11 during the transportation of a product to which the pipe is attached or in other handling processes; accordingly, the assembly work of parts to a substrate will be hindered in a flow-pattern assembly line or the like to result in a delay of work. Further, in the case of hot brazing, since it is unfeasible to secure a pipe having a coating film formed by plating with an anticorrosive material or the like, unavoidably, pipes must be subjected to a plating/coating process after secured through hot brazing; accordingly, handling of the pipe P' previously bent will be troublesome to result in a remarkable decrease in productivity and the like.

SUMMARY OF THE INVENTION

It is the object of the present invention to provide a clamp member with structure for firmly securing piping and wiring which facilitates assembly work, attains reliable firm securing without casuing slackening, eliminates a fear of deviating, shifting and falling after fixation, and allows securing without damaging plated coating films previously applied to parts to be secured or clamp bodies.

In brief, the present invention resides in a clamp member with structure for firmly securing piping and wiring which is featured in that a clamp body made of a metal strip piece has a flat mounting wall section with a mounting hole formed at a position near to the distal end thereof that hole is used for mounting to a mating substrate, and a sectionally semi-circular curved wall section contiguous with the flat mounting wall section and defined by folding back of the remaining portion of the metal strip piece; additionally, an endless belt element made of a thermally contractable resin material is used which is fitted from inside to the curved wall section; in securing, either a pin element or a part to be secured is laid axially inside the endless belt element portion surrounded by the curved wall section, and a different part to be secured is also laid axially inside the endless belt element, so that these parts are arranged side by side; and then, the endless belt element is subjected to thermal contraction, so that the parts are secured and held by the endless belt element and the clamp body in a bundled parallel state.

DETAILED DESCRIPTION OF THE PREFERRED EMBODIMENTS

Figure 1:
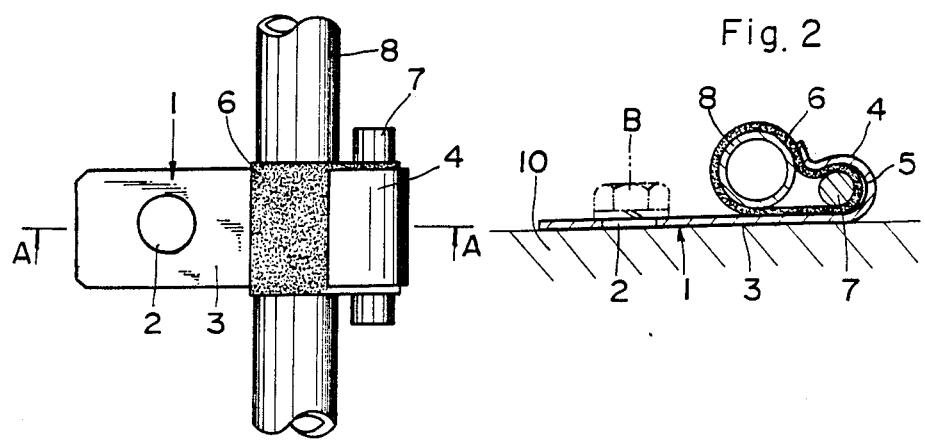
FIG. 1 is a plan view showing a clamp member with structure for firm securing according to an embodiment of the present invention.

In FIGS. 1 through 4, identical components are designated by the same reference numeral.

Figure 2:
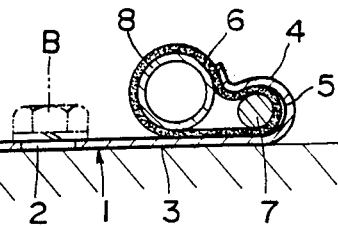
FIG. 2 is a sectional view taken along line A—A in FIG. 1.

In FIGS. 1 and 2, 1 is a clamp body made of a metal strip piece which has a flat mounting wall section 3 with a mounting hole 2 formed at a position near to the distal end thereof that hole is used for mounting to a mating substrate 10 by means of a bolt B, and a sectionally semi-circular curved wall section 4 contiguous with the flat mounting wall section 3 and defined by folding back of the remaining portion of the metal strip piece. 6 is an endless belt element made of a thermally contractable resin material whose portion is fitted from inside to the curved wall section 4. In securing, with a pipe 8 loosely laid inside the endless belt element, this pipe 8 is located on the mounting wall section 3 outside a no-wall gap 5 contiguous with the curved wall section 4, the remaining portion of the endless belt element 6 is inserted through the gap 5 into the inside of the curved wall section 4, and a pin element 7 is passed inside the inserted portion of the endless belt element to prevent the endless belt element from coming out of the inside of the curved wall section 4. Then, the whole combination inclusive of a product and the pipe 8, or only the thus assembled block, is heated to a comparatively low temperature of about 120° C.; as a result, due to thermal contraction of the endless belt element 6, the pipe 8 is firmly secured to the clamp body.

Figure 3:
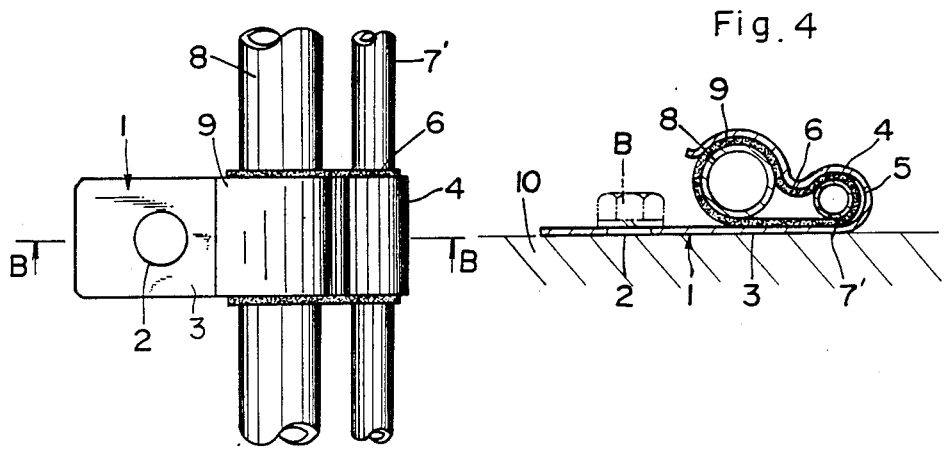
FIG. 3 is a plan view, similar to FIG. 1, showing another embodiment.
Figure 4:
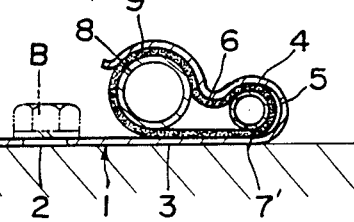
FIG. 4 is a sectional view taken along line B—B in FIG. 3.
Figure 5:
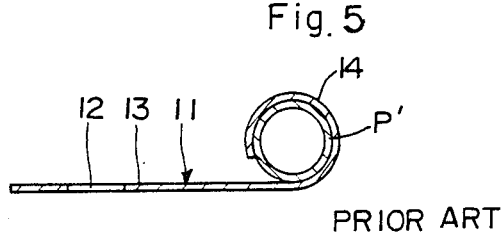
FIG. 5 is a vertical sectional view showing a conventional clamp member.

FIGS. 3 and 4 show another embodiment and correspond to FIGS. 1 and 2, respectively. To secure a plurality of pipes at the same time, instead of the pin element 7 another pipe 7' is passed through the inside space, on the side of the curved wall section 4, of the endless belt element 6, and the distal end of the curved wall section 4 is extended beyond the gap 5 to define a holding wall section 9 for holding the first pipe 8. Accordingly, this second embodiment can hold and firmly secure a plurality of pipes in a bundled parallel state at the same time.

As described above, the firmly securing structure of the clamp member for piping and wiring according to the present invention holds and firmly secures the parts to be secured by utilizing thermal contraction of the endless belt element 6 made of a thermally contractable resin material which is fitted from inside to the curved wall section 4 of the clamp body 1 or to the curved holding section consisting of the curved wall section 4 and the holding wall section 9. Therefore, the step of pinching/pressing the wall section from outside and the heat brazing process are not required in assembling, the assembly work is simplified, there is no fear of the parts deviating, shifting and falling due to slackening after assembly, the parts 8 and 7' to be secured and the clamp body 1, previously plated/coated, can be subjected to the firmly-securing step, and the productivity can be remarkably enhanced because of no need for plating after securing.

What is claimed is:

1. A clamp for firmly securing two elongated members to a mating substrate, said clamp comprising:
    a clamp body made of a metal strip having a mounting wall section for mounting to the mating substrate and a sectionally semi-circular curved wall section curved back toward the mounting wall section but spaced therefrom;
    an endless belt made of a thermally contractable resin material, a portion of said endless belt being fitted intermediate the curved wall section and the mounting wall section, and the remainder of said endless belt being external to said curved wall section;
    a first elongated member securely retained within the portion of the endless belt intermediate the curved wall section and the mounting wall section; and
    a second elongated member generally parallel to the first elongate member and retained within the portion of the endless belt external to said curved wall portion;
    wherein the first and second elongate members are held and secured in a bundled parallel state by means of thermal contraction of the endless belt.

2. A clamp as in claim 1 wherein the first elongate member is a pin element.

3. A clamp as in claim 2 wherein the second elongated member is a pipe.

4. A clamp as in claim 1 wherein the first and second elongate members are pipes.

5. A clamp as in claim 1 wherein the metal strip comprises a distal end spaced from the mounting wall section, said distal end being bent away from said mounting wall section to define a holding section toward which the second elongate element is urged by the thermal contraction of the endless belt.

6. A clamp as in claim 1 wherein said sectionally semi-circular curved wall section defines a first curved wall section, and wherein said clamp body further comprises a second curved wall section adjacent said first curved wall section, the remaining portion of said endless belt and the second elongate member being held within the second curved wall section of said clamp body.

* * * * *